United States Patent [19]

Lee, Jr.

[11] 4,154,712

[45] May 15, 1979

[54] LOW MOLECULAR WEIGHT POLYPHENYLENE ETHER COMPOSITIONS

[75] Inventor: Gim F. Lee, Jr., Albany, N.Y.

[73] Assignee: General Electric Company, Pittsfield, Mass.

[21] Appl. No.: 838,394

[22] Filed: Sep. 30, 1977

[51] Int. Cl.² .................. C08L 25/10; C08L 53/02; C08L 71/04
[52] U.S. Cl. .......................... 260/29.1 R; 260/42.47; 260/874
[58] Field of Search ............ 260/874, 47 ET, 29.1 R, 260/42.47

[56] References Cited

U.S. PATENT DOCUMENTS

| | | | |
|---|---|---|---|
| 3,383,435 | 5/1968 | Cizek | 260/87 A |
| 4,038,343 | 7/1977 | Yonemitsu et al. | 260/87 A |
| 4,054,553 | 10/1977 | Olander | 260/47 ET |

*Primary Examiner*—Lester L. Lee
*Attorney, Agent, or Firm*—Morgan, Finnegan, Pine, Foley & Lee

[57] ABSTRACT

Novel compositions are disclosed which comprise a low molecular weight polyphenylene ether resin having an intrinsic viscosity of less than about 0.4 dl/g, preferably less than 0.33 dl/g, as measured in chloroform at 30° C., an elastomeric block copolymer of a vinyl aromatic compound and a conjugated diene, and a plasticizer. Also included within the scope of the invention are reinforced and flame-retardant compositions.

22 Claims, No Drawings

LOW MOLECULAR WEIGHT POLYPHENYLENE ETHER COMPOSITIONS

This invention relates to polyphenylene ether resin compositions having improved impact resistance. More particularly, it pertains to compositions comprising a low molecular weight polyphenylene ether resin, e.g., having a molecular weight of less than about 16,000 and an A-B-A$^1$ type block copolymer. The compositions provide molded articles of good impact strength even though low molecular weight polyphenylene ether resins are normally not impact resistant materials.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,499; Blanchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al., U.S. Pat. No. 3,440,217; and disclosures relating to metal-based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,383,435 discloses polyphenylene ether-styrene resin compositions. All of the above-mentioned disclosures are incorporated herein by reference.

In general, the mechanical or physical properties of polymers are very dependent upon molecular weight. With respect to polyphenylene ether resin compositions, it has been observed that, for example, the impact strength of a polyphenylene ether resin, as measured by Notched Izod impact, decreases in proportion to a decrease in the intrinsic viscosity and, correspondingly, the molecular weight of the polyphenylene ether resin. Conversely, a decrease in molecular weight results in improved processability.

It has generally been thought that the use of polyphenylene ether resins of relatively high molecular weight, i.e., 16,000 or greater, is essential if good impact strengths are to be obtained in the finished molded article. Such high molecular weight polyphenylene ether resins are characterized by having polymer chains of 130 units or more and intrinsic viscosities, as measured in chloroform at 30° C., of at least about 0.4 dl/g or more.

It has now been surprisingly discovered that when a low molecular weight polyphenylene ether resin, i.e., having an intrinsic viscosity of less than 0.4 dl/g, preferably 0.33 dl/g, as measured in chloroform at 30° C., is combined with an elastomeric block copolymer of a vinyl aromatic compound and a conjugated diene, and triphenyl phosphate as a plasticizer, the resulting composition possesses good impact strength. The results are unexpected in view of the strong belief in the prior art that low molecular weight polyphenylene ether resins should be avoided where high impact resistance is desired.

It is, therefore, a primary object of this invention to provide improved compositions that are based on polyphenylene ether resins, elastomeric block copolymers, and plasticizers.

Another object of this invention is to provide molding compositions and molded articles that are based on a polyphenylene ether resin and an elastomeric block copolymer and that have improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:

(a) a polyphenylene ether resin;

(b) an elastomeric block copolymer of the A-B-A$^1$ type, wherein terminal blocks A and A$^1$ are the same or different and are polymerized vinyl aromatic hydrocarbons and center block B is a polymerized conjugated diene, the molecular weight of B being higher than the combined molecular weights of A and A$^1$; and (c) a plasticizer.

The polyphenylene ether resins (a) are low molecular weight resins having less than 130 structural units per molecule, or a molecular weight of less than 16,000. The intrinsic viscosity of the resin, when measured in solution in chloroform at 30° C., is less than 0.4 dl/g, preferably from about 0.1 to about 0.33 dl/g.

The preferred polyphenylene ethers are of the formula

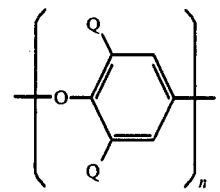

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly (2,6-dimethyl-1,4-phenylene) ether.

In general, the polyphenylene ether resins of this invention can be prepared by following procedures fully described in the above-mentioned patents of Hay and Stamatoff. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time, longer times providing a higher average number of repeating structural units. At some point before a molecular weight of 16,000, or an intrinsic viscosity of 0.4 dl/g (as measured in chloroform at 30° C.) is obtained, the reaction is terminated. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime sodium hydroxide, potassium hydroxide, and the like, or the product is separated from the catalyst by filtration, precipitation or other suitable means, as taught by Hay in U.S. Pat. No. 3,306,875.

The elastomeric block copolymer (b) is of the A-B-A$^1$ type in which the center and terminal block vary. In the compositions of this invention, the center block, B, is derived from a conjugated diene, e.g., butadiene, isoprene, 1,3-pentadiene, 2,3-dimethyl butadiene, or the like, and terminal blocks A and A$^1$ are derived from a vinyl aromatic compound, e.g., styrene, α-methyl styrene, vinyltoluene, vinyl naphthalene, or the like. In the most preferred compositions, the block copolymer will have terminal blocks A and A$^1$ comprised of polystyrene and center block B comprised of polybutadiene or polyisoprene.

The ratios of the comonomers can vary broadly, so long as the molecular weight of the center block is greater than the combined molecular weights of the terminal blocks. Preferably, within this limitation, the molecular weight of each terminal block will range from about 2,000 to about 100,000 and that of the center block will range from about 25,000 to about 1,000,000.

Such copolymers can be prepared by an organometallic initiation process using, for example, sodium or lithium metal or an organic derivative thereof. The diene monomers can be polymerized with a monofunctional or difunctional initiator, as is described in detail in "Polymer Chemistry of Synthetic Elastomers," edited by Kennedy et al., Interscience Publishers, Vol. 23, Part II (1969), pages 553–559, incorporated herein by reference.

Other methods of preparation are described in Zelinski, U.S. Pat. No. 3,251,905 and Holden et al., U.S. Pat. No. 3,231,635, the disclosures of which are incorporated herein by reference.

Any of several well-known plasticizers is useful in this invention as component (c). Preferably the plasticizer will be selected from the group of triphenyl phosphate, mineral oil, adipates, azolates, phthalates, and the like. Especially preferably the plasticizer will be triphenyl phosphate. Other useful plasticizers, as disclosed in copending, commonly assigned U.S. patent applications Ser. No. 752,731, filed Dec. 21, 1976, now abandoned Ser. No. 753,511, filed Dec. 21, 1976, and Ser. No. 755,025, filed Dec. 28, 1976, each of which is incorporated herein by reference include compounds of the formula

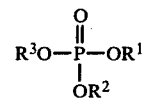

wherein R$^1$, R$^2$ and R$^3$ are the same or different and are alkyl, haloalkyl, cycloalkyl halocycloalkyl, aryl, alkyl substituted aryl, haloalkyl substituted aryl, aryl substituted alkyl, haloaryl substituted alkyl, hydroxyalkyl, hydroxyaryl, hydroxyalkaryl, halogen, haloaryl, hydrogen, and halogen-substituted aryl.

Examples include cresyl diphenyl phosphate, 2-ethylhexyl diphenyl phosphate, tricresyl phosphate, triisopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate, tri-(polychlorophenyl) phosphate, and mixtures thereof.

Examples of phthalate plasticizers include dibenzyl phthalate, phenyl cresyl phthalate, diethyl phthalate, dimethyl phthalate, phenyl benzyl phthalate, butyl benzyl phthalate, butyl cyclohexyl phthalate, dibutyl phthalate, octyl cresyl phthalate, diphenyl phthalate, di-n-hexyl phthalate, disohexyl phthalate, butyl octyl phthalate, butyl decyl phthalate, diisooctyl phthalate, di-2-ethylhexyl phthalate, di-n-octyl phthalate, diisononyl phthalate, diisodecyl phthalate, di-2-propyl heptyl phthalate, di-n-nonyl phthalate, di-n-decyl phthalate and ditridecyl phthalate.

Commercially available aromatic phosphates which have been found to be particularly useful are FMC Corporation's Kronitex 50 and Kronitex 300, which are isopropylated triphenyl phosphate compounds.

The amount of A-B-A$^1$ block copolymers and other components in the compositions can vary broadly. Preferred compositions will comprise from about 75 to about 99 parts by weight of polyphenylene ether resin (a), from about 1 to about 25 parts by weight of A-B-A$^1$ block copolymer (b), and from about 90 to about 70 parts by weight of plasticizer (c).

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

Although it is only necessary to have at least a reinforcing amount of the reinforcement present, in general, the combination of components (a) plus (b) plus (c) will comprise from about 40 to about 99 parts by weight, and the filler will comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably, the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes, or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125".

It is a preferred feature of this invention also to provide flame-retardant thermoplastic compositions, as defined above, by modifying the composition to include a flame-retardant additive in a minor proportion but in an amount at least sufficient to render the composition non-burning or self-extinguishing.

A preferred feature of the invention is a flame-retardant composition as above defined, which also includes a halogenated organic compound, a halogenated organic compound in admixture with an antimony compound, elemental phosphorus, a phosphorus compound, compounds containing phosphorus-nitrogen bonds, or a mixture of two or more of the foregoing.

When used herein, the terms "non-burning," "self-extinguishing," and "non-dripping" are used to describe compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-elastomeric block copolymer composition—major proportions will detract from physical properties—but at least sufficient to render the composition non-burning or self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a) plus (b) plus (c). A preferred range will be from about 1 to 25 parts, and an especially preferred range will be from about 3 to 15 parts of additive per 100 parts of (a) plus (b) puls (c). Smaller amounts of compounds highly concentrated in the elements responsible for flame retardance will be sufficient, e.g., elemental red phosphorus will be preferred at about 0.5 to 10 parts by weight per hundred parts of (a) plus (b) plus (c), while phosphorus in the form of triphenyl phosphate will be used at about 3 to 25 parts of phosphate per hundred parts of (a) plus (b) plus (c), and so forth. Halogenated aromatics will be used at about 2 to 20 parts and synergists, e.g., antimony oxide, will be used at about 1 to 10 parts by weight per 100 parts of components (a) plus (b) plus (c).

Among the useful halogen-containing compounds are those of the formula

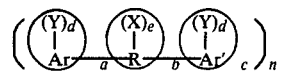

wherein n is 1 to 300 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. Nos. 3,647,747 and 3,334,154, both of which are incorporated herein by reference.

Ar and Ar' are mono- or polycarbocyclic aromatic groups such as phenylene, biphenylene, terphenylene, naphthylene, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphate compounds are selected from the group of elemental phosphorus and organic phosphonic acids, phosphonates, phosphinates, phosphonites, phosphinites, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

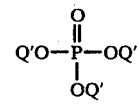

and nitrogen analogs thereof where each Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include, phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis-(2-ethylhexyl)-phenyl phosphate, tri(nonylphenyl) phosphate, phenylmethyl hydrogen phosphate, di(dodecyl ) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionaly, antimony oxide. Especially preferred is a composition comprised of mixed triaryl phosphates with one or more isopropyl groups on some or all of the aromatic rings, such as Kronitex 50 supplied by the Food Machinery Corporation.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide, or tetrakis (hydroxymethyl) phosphonium chloride. These frame-retardant additives are commercially available.

The compositions of the invention may be formed by conventional techniques, that is, by first dry mixing the components to form a premix, and then passing the premix through an extruder at an elevated temperature, e.g., 425° to 640° F., cooling and chopping the extrudate into pellets, and molding the pellets into a desired shape.

By way of illustration, glass roving (a bundle of strands of filaments) is chopped into small pieces, e.g., ⅛″ to 1″ in length, and preferably less than ¼″ in length and put into an extrusion compounder with (a) the polyphenylene ether resin, (b) the elastomeric block copolymer of a vinyl aromatic compound and a conjugated diene, (c) the plasticizer, and (d) the flame-retardant additive(s), to produce molding pellets. The fibers are shortened and predispersed in the process, coming out at less than 1/16″ long. In another procedure, glass filaments are ground or milled to short lengths, are mixed with the polyphenylene ether resin, the elastomeric block copolymer, the plasticizer, and, optionally, flame-retardant additive, by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

Compositions comprised of poly(2,6-dimethyl-1,4-phenylene ether) resin; a styrene-butadiene-styrene block copolymer known as Kraton 1101, supplied by Shell Chemical Co.; and triphenyl phosphate were prepared and injection molded at 550° F. (mold temperature 180° F.), and evaluated for mechanical properties. The formulations and test results are shown in the following table:

Table 1.

| EXAMPLE | I | C-1* |
|---|---|---|
| Composition (parts by weight)[a] | | |
| poly(2,6-dimethyl-1,4-phenylene ether) resin (0.46 I.V.) | — | 85 |
| poly(2,6-dimethyl-1,4-phenylene ether) resin (0.31 I.V.) | 85 | — |
| Kraton 1101 | 5 | 5 |
| Triphenyl phosphate | 15 | 15 |
| Properties | | |
| Tensile yield, psi × $10^{-3}$ | 9.4 | 10.9 |
| Tensile strength, psi × $10^{-3}$ | 7.2 | 10.2 |
| Tensile elongation, % | 39 | 60 |
| Izod impact strength, ft.lbs/in.notch | 2.3 | 7.0 |
| Gardner impact strength, in.lbs. | 132 | 322 |
| UL Bulletin No. 94 rating | V-O | V-O |
| Melt viscosity at 540° F., 1500 sec$^{-1}$, poise | 1450 | 5000 |
| Heat distortion temp., ° F. | 234 | 262 |

*Comparative Example
[a]Compositions also contain 1.5 parts by weight polyethylene, 0.5 parts by weight tridecylphosphite, 0.15 parts by weight zinc sulfide, and 0.15 parts by weight zinc oxide.

It can be seen from the above that although compositions comprised of low molecular weight polyphenylene ether resin and an elastomeric block copolymer have lower impact strength, the impact strength is still quite good. Other physical properties are good also.

Obviously, other modifications and variations of the present invention are possible in the light of the above teachings. It is, therefore, to be understood that changes may be made in the particular embodiments described above which are within the full intended scope of the invention as defined in the appended claims.

I claim:

1. A thermoplastic composition which, after molding, has good impact resistance, said composition comprising:
   (a) a low molecular weight polyphenylene ether resin, said resin having an intrinsic viscosity of less than about 0.4 dl/g when measured in solution in chloroform at 30° C.;
   (b) an elastomeric block copolymer of the A-B-A$^1$ type, wherein terminal blocks A and A$^1$ are the same or different and are polymerized vinyl aromatic hydrocarbons and center block B is a polymerized conjugated diene, the molecular weight of B being higher than the combined molecular weights of A and A$^1$; and
   (c) a plasticizer.

2. The composition of claim 1 wherein the polyphenylene ether resin (a) has an intrinsic viscosity of from about 0.1 to about 0.33 dl/g when measured in solution in chloroform at 30° C.

3. The composition of claim 1 wherein the polyphenylene ether resin is selected from compounds of the formula

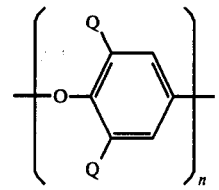

wherein the oxygen ether atom of one unit is connected to the benzene nucleus of the next adjoining unit, n is a positive integer and it at least 50, and each Q is a monovalent substituent selected from the group consisting of hydrogen, halogen, hydrocarbon radicals free of a tertiary alpha-carbon atoms, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

4. The composition of claim 3 wherein each Q is an alkyl radical having from 1 to 4 carbon atoms.

5. The composition of claim 3 wherein said polyphenylene ether is poly(2,6-dimethyl-1,4-phenylene) ether.

6. The composition of claim 1 wherein in A-B-A¹ block copolymer (b), each of terminal blocks A and A¹ has an average molecular weight of from about 2,000 to about 100,000 and center block B has an average molecular weight of from about 25,000 to about 1,000,000.

7. The composition of claim 1 wherein in the A-B-A¹ block copolymer (b), the vinyl aromatic hydrocarbons of terminal blocks A and A¹ are selected from the group consisting of styrene, α-methyl styrene, vinyltoluene, vinyl xylene, and vinyl naphthalene and the conjugated diene of center block B is selected from the group consisting of butadiene, isoprene, 1,3-pentadiene, and 2,3-dimethylbutadiene.

8. The composition of claim 1 which comprises from about 75 to about 99 parts by weight of polyphenylene ether resin (a), from about 1 to about 25 parts by weight of A-B-A¹ block copolymer (b), and from about 10 to about 70 parts by weight of plasticizer.

9. The composition of claim 1 wherein said composition includes a reinforcing amount of an inorganic reinforcing filler.

10. The composition of claim 9 wherein said composition includes from 10 to 80% by weight of fibrous glass filaments, based on the total weight of the composition.

11. The composition of claim 1 wherein said composition includes a flame-retardant amount of a flame-retardant additive.

12. The composition of claim 11 wherein said flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

13. A thermoplastic composition which, after molding, has good impact resistance, said composition comprising:
(a) from about 75 to about 99 parts by weight of a low molecular weight polyphenylene ether resin, said resin having an intrinsic viscosity of less than about 0.4 dl/g when measured in solution in chloroform at 30° C.;
(b) from about 1 to about 25 parts by weight of an elastomeric block copolymer of the A-B-A¹ type, wherein terminal blocks A and A¹ are the same or different and are polymerized vinyl aromatic hydrocarbons and center block B is a polymerized conjugated diene, the molecular weight of B being higher than the combined molecular weights of A and A¹; and
(c) from about 10 to about 70 parts by weight of plasticizer.

14. The composition of claim 13 wherein said polyphenylene ether resin is poly(2,6-dimethyl-1,4-phenylene) ether.

15. A thermoplastic composition which, after molding, has good impact resistance, said composition comprising:
(a) from about 75 to about 99 parts by weight of a low molecular weight polyphenylene ether resin, said resin having an intrinsic viscosity of less than about 0.4 dl/g when measured in solution in chloroform at 30° C.;
(b) from about 1 to about 25 parts by weight of an elastomeric block copolymer of the A-B-A¹ type, wherein terminal blocks A and A¹ are the same or different and are polymerized vinyl aromatic hydrocarbons and center block B is a polymerized conjugated diene, the molecular weight of B being higher than the combined molecular weights of A and A¹;
(c) from about 10 to about 70 parts by weight of plasticizer; and
(d) a reinforcing amount of an inorganic reinforcing filler.

16. The composition of claim 15 wherein said polyphenylene ether resin is poly(2,6-dimethyl-1,4-phenylene) ether.

17. The composition of claim 15 wherein said reinforcing filler comprises from 10 to 80% of fibrous glass filaments, based on the total weight of the composition.

18. A thermoplastic composition which, after molding, has good impact resistance, said composition comprising:
(a) from about 75 to about 99 parts by weight of a low molecular weight polyphenylene ether resin, said resin having an intrinsic viscosity of less than about 0.4 dl/g when measured in solution in chloroform at 30° C.;
(b) from about 1 to about 25 parts by weight of an elastomeric block copolymer of the A-B-A¹ type, wherein terminal blocks A and A¹ are the same or different and are polymerized vinyl aromatic hydrocarbons and center block B is a polymerized conjugated diene, the molecular weight of B being higher than the combined molecular weights of A and A¹; and
(c) from about 10 to about 70 parts by weight of plasticizer; and
(d) a flame-retardant amount of a flame-retardant additive.

19. The composition of claim 18 wherein said flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

20. The composition of claim 18 wherein said flame-retardant additive comprises a mixture of an organic bromine-containing compound with antimony oxide.

21. The composition of claim 18 wherein said flame-retardant additive is triphenylphosphate.

22. The composition of claim 18 wherein said flame-retardant additive is comprised of a mixture of triaryl phosphates wherein one or more aryl groups are substituted by one or more isopropyl groups.

* * * * *